US 6,654,771 B1

(12) United States Patent
Parham et al.

(10) Patent No.: US 6,654,771 B1
(45) Date of Patent: *Nov. 25, 2003

(54) METHOD AND SYSTEM FOR NETWORK DATA REPLICATION

(75) Inventors: Jeffrey B. Parham, Redmond, WA (US); William B. Lees, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 345 days.

This patent is subject to a terminal disclaimer.

(21) Appl. No.: 09/677,945

(22) Filed: Oct. 2, 2000

Related U.S. Application Data

(63) Continuation-in-part of application No. 09/461,831, filed on Dec. 15, 1999, now Pat. No. 6,453,326.
(60) Provisional application No. 60/144,576, filed on Jul. 19, 1999.

(51) Int. Cl.[7] ............................................. G06F 17/30
(52) U.S. Cl. ..................... 707/204; 707/202; 709/221; 709/223
(58) Field of Search ................... 707/202, 204, 707/10; 709/221, 223

(56) References Cited

U.S. PATENT DOCUMENTS

| | | | | |
|---|---|---|---|---|
| 5,721,915 A | * | 2/1998 | Sockut et al. ............... | 707/200 |
| 5,884,322 A | * | 3/1999 | Sidhu et al. .................. | 707/10 |
| 6,122,630 A | * | 9/2000 | Strickler et al. .............. | 707/10 |
| 6,263,360 B1 | * | 7/2001 | Arnold et al. ................ | 707/10 |
| 6,324,571 B1 | * | 11/2001 | Hacherl ........................ | 705/9 |
| 6,453,326 B1 | * | 9/2002 | Parham et al. .............. | 707/202 |

* cited by examiner

*Primary Examiner*—Safet Metjahic
*Assistant Examiner*—Cam-Linh Nguyen
(74) *Attorney, Agent, or Firm*—Woodcock Washburn LLP

(57) ABSTRACT

Techniques are provided for replicating database changes among servers of a database system that effectively removes the inconsistency problems encountered after restoration from backup and due to removal and re-addition of partitions by assigning a new GUID to a server after it has been restored or after the partition has been re-added. This new GUID is used for identifying new changes made by the server after restoration or partition re-addition. By virtue of the use of the new GUID, new changes made after restoration will not be confused with any changes made by the server after the backup and before the restoration, which are identified by the old GUID of the server, thereby ensuring convergence of the servers' data through replication. Similarly, by virtue of the use of the new GUID, new changes made after re-addition of a partition will not be confused with any changes made prior to the re-addition of the partition.

17 Claims, 13 Drawing Sheets

METHOD AND SYSTEM FOR NETWORK DATA REPLICATION

CROSS REFERENCE TO RELATED APPLICATION

This application is a continuation-in-part of U.S. Ser. No. 09/461,831 now U.S. Pat. No. 6,453,326, filed Dec. 15, 1999, issued Sep. 17, 2002, which claims the benefit of U.S. Provisional Application Ser. No. 60/144,576, filed Jul. 19, 1999.

FIELD OF THE INVENTION

This invention relates generally to database systems, and more particularly to data replication among multiple servers of a database network.

BACKGROUND OF THE INVENTION

A database system often contains multiple servers connected via a network. In order to keep the data maintained by each server up to date, changes made by one server are replicated to all other servers of the database system. Replication is the process by which changes present on a "source" server are received by and applied to a "destination" server. The changes being replicated may have originated on the source server or on another server.

For instance, in a proposed computer network, a plurality of directory service agents (DSAs) each maintain a local database of directory service information. Each of the DSAs can make changes to the directory information, and the changes are replicated to other DSAs in the network. To keep track of the changes to allow proper replication, each change (e.g., creating a new user, changing a user's password, etc.) originated by a DSA is identified by a database globally unique identification (GUID) and an update sequence number (USN). The database GUID identifies the local database of the DSA in which the change was originated. Each database GUID corresponds to exactly one DSA. The USN is a monotonically increasing serial number that is, for example, a 64 bit number. It increases by one for each originating or replicated-in change applied to the database.

The database GUID and the USN together form a "signature" represented as a (Database-GUID, USN) pair, which uniquely identifies the change—i.e., no two changes should carry the same signature. In this regard, a USN is meaningless without the context of the database GUID for the purpose of uniquely identifying the change. For example, the change (Database-GUID1, 5) does not have any relevance to the change (Database-GUID2, 5). The change (Database-GUID1, 10), on the other hand, does have a relationship to the change (Database-GUID1, 5) in that the change at USN 10 was made after the change at USN 5, because the USNs were associated with the same database GUID and USNs increase over time.

Each update in a DSA's database is labeled with the signature of the change generated by the originating write and the USN at which the change was applied locally by the DSA. The latter is known as "usnChanged." For an update that originated on the local DSA, the USN in the signature and the usnChanged are identical, and the database GUID in the signature is the database GUID of the local DSA. For an update that originated on another DSA and was later replicated to the local DSA, the USN in the signature (which is relative to the database GUID of the originating DSA) bears no relationship with the usnChanged (which is relative to the database GUID of the local DSA), and the database GUID in the signature is not the database GUID of the local DSA.

To facilitate replication of changes, each DSA tracks "watermarks" of the signatures issued on all other DSAs for changes that it has applied locally. The watermark is an assertion that every change made on the DSA corresponding to the database GUID at or below the given USN has been applied to the local DSA. This includes changes originated on the DSA with the given GUID as well as changes originated on other DSAs that have been applied to the DSA with the given GUID. For example, if DSA2 has recorded the watermark (Database-GUID1, 10), then it asserts that it has applied all changes made in Database-GUID1 at USNs 1, 2, 3, ..., 10. The set of watermarks a particular DSA has with respect to all other DSAs is known as its "up-to-dateness vector," or "UTD vector."

In this proposed network database, the receiver of changes initiates the replication. In other words, the destination DSA asks the "source" DSA for any changes the source DSA may have that the destination does not. This form of replication is also known as "pull" replication. To respond to the replication request, the source DSA needs an efficient method to locate these changes that should be replicated to the destination DSA. It does so by checking in the UTD vector presented by the destination DSA in its request for a watermark relative to the source DSA's database GUID. If such a watermark is found, and assuming the watermark is X, the source DSA knows that it only has to look at updates in its database with usnChanged value greater than X. This is because the UTD vector indicates that all changes originated or replicated by the source DSA with USN at or below X have already been applied to the destination DSA, so that updates with usnChanged that are less than or equal to X do not have to be replicated again. If no watermark relative to the source DSA's database GUID can be found, the destination has to look at all updates in its database, i.e., starting at USN 0.

For each update on the source DSA found by comparing its usnChanged with the watermark, the source DSA looks at the signature of the update and references it against the UTD vector provided by the destination. If a watermark is found with the database GUID of the signature of the change, the change has to be sent to the destination DSA if and only if the USN of the signature is greater than the USN in the watermark. This is again because the watermark indicates that the destination has applied all updates at or prior to its associated USN. If no watermark is found with the database GUID of the signature, the update is sent to the destination DSA.

After the destination has received and applied all changes sent by the source DSA, the destination DSA then asserts it is at least as up-to-date with respect to other DSAs as the source DSA is. The destination DSA then updates each of its watermarks to at least the corresponding USN recorded in the watermarks with corresponding database GUIDs at the source, and adds any watermarks relative to database GUIDs not in its own UTD vector but present in the source DSA's UTD vector.

Although this scheme of controlling data replication based on watermarks can potentially provide efficient data replication across a database system, the reliability of the replication is put in question in the event a server has to be restored from backup. In real-world operations, there is always the risk that the local database of a server will be damaged or somehow made irrecoverable such that the database has to be reconstructed from a backup. A consequence of the restoration is that the restored server has lost the changes it made after the backup and before the restoration. Those "lost" changes, however, may have already been replicated to other servers in the system. When the restored server continues from the restored state and adds new changes, some of the changes may be given signatures that have already been used for changes made before the restoration and replicated to other servers. Thus, two coexisting yet different changes may have the same signature. This can cause great confusion and inconsistency in the data replication, and, as a result, there is no guarantee of the convergence of the data on different servers through replication. Different approaches, such as the "backsyncing" process that will be described in greater detail below, have been proposed to address this problem of replication after restoration, but fail to provide satisfactory results.

There is another scenario in which directory service information may be lost, potentially creating replication inconsistencies. This problem arises in the context of the replication of directory service partition(s) that can be dynamically added to and removed from DSAs. Due to the removal and/or addition of one or more partitions, current replication techniques, as applied to DSAs, may lose some changes, causing inconsistency across DSAs. Consequently, it would be desirable to provide a solution wherein information that is replicated in a distributed system may persist across the addition and removal of partitions, thereby preventing the loss of directory service information due to the removal/addition of directory service partitions and maintaining consistency across DSAs.

SUMMARY OF THE INVENTION

In view of the foregoing, the present invention provides a method and system for replicating database changes among servers of a database system that effectively removes the inconsistency problems encountered after restoration from backup and due to removal and re-addition of partitions by assigning a new GUID to a server after it has been restored or after the partition has been re-added. This new GUID is used for identifying new changes made by the server after restoration or partition re-addition. By virtue of the use of the new GUID, new changes made after restoration will not be confused with any changes made by the server after the backup and before the restoration, which are identified by the old GUID of the server, thereby ensuring convergence of the servers' data through replication. Similarly, by virtue of the use of the new GUID, new changes made after re-addition of a partition will not be confused with any changes made prior to the removal of the partition.

In the restoration case, the replication performance is further optimized by recording the GUID used by a server and its highest replication sequence number each time a backup of the server is made. The array of used GUIDs and highest backup USNs of a server formed in this way over time provides the history of backup and restoration of the server and is used to avoid replicating changes by the restored server that have already been replicated. Similarly, for the partition re-addition case, the array of used GUIDs and the new GUID assigned to a server after partition re-addition may be used to reliably and efficiently replicate old and new changes to other databases in the network.

Other features of the present invention are described below.

BRIEF DESCRIPTION OF THE DRAWINGS

The system and methods for network data replication are further described with reference to the accompanying drawings in which.

DETAILED DESCRIPTION OF PREFERRED EMBODIMENTS

The present invention is directed to a reliable and efficient way to handle replication among database servers when a server has to be restored from backup. In another embodiment, the present invention is directed to a reliable and efficient way to handle replication among database servers when a partition has been removed from and re-added to a database.

Figure 1:
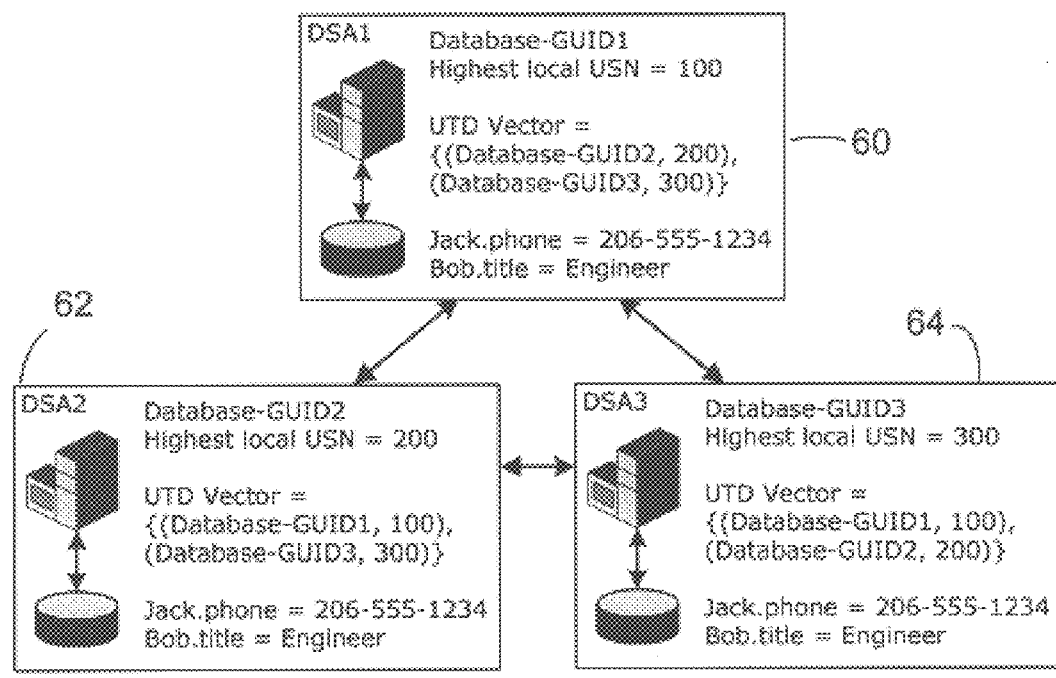
FIG. 1 is a schematic diagram showing the initial states of three directory service agents (DSAs) of a database network in connection with an embodiment of the present invention.

Turning to the drawings, wherein like reference numerals refer to like elements, the exemplary embodiments of the present invention are described. FIG. 1 shows an exemplary database system with three directory service agents (DSAs) 60, 62, and 64. In this database system, each DSA may make changes to the database system, and the changes are replicated to other servers. To facilitate an understanding of the operation and effectiveness of the present invention, the problems in data replication caused by restoration from backup are first described by way of example.

Referring to FIG. 1, DSA1 60 is at USN 100 using Database-GUID1, DSA2 is at USN 200 using Database-GUID2, and DSA3 is at USN 300 using Database-GUID3. Each DSA has applied all changes originated on the other DSAs. Accordingly, the UTD vector of DSA1 is {(Database-GUID2, 200), (Database-GUID3, 300)}. The UTD vector of DSA2 is {(Database-GUID 1, 100), (Database-GUID3, 300) }. The UTD vector of DSA3 is {(Database-GUID1, 100), (Database-GUID2, 200)}. In the illustrated example, all DSAs agree that Jack's phone number is 206-555-1234 and Bob's job title is Engineer.

Figure 2:
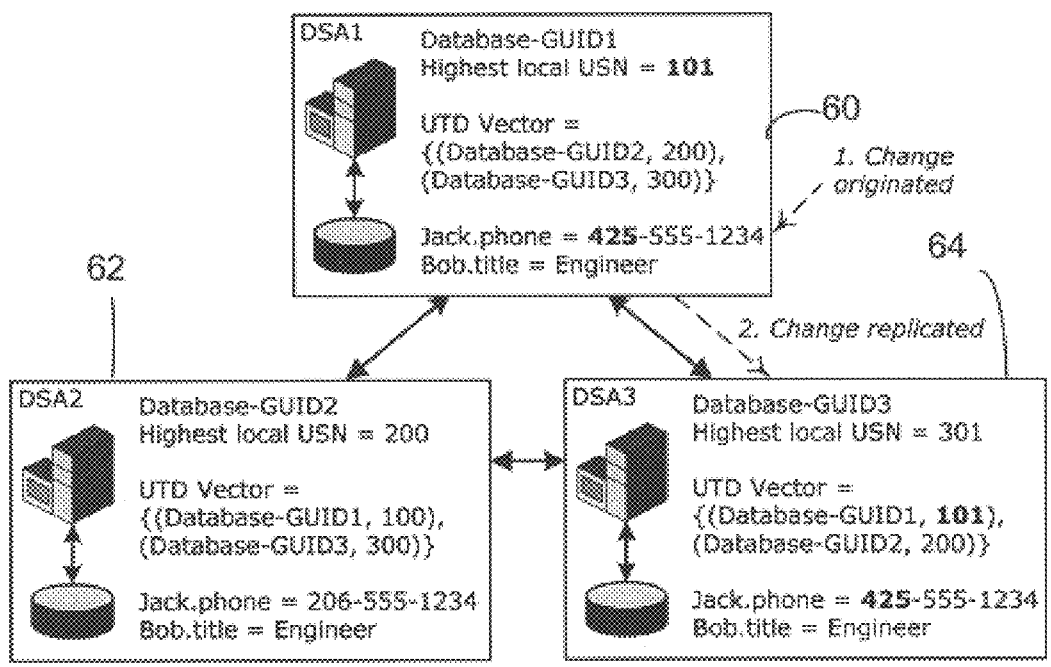
FIG. 2 is a schematic diagram showing the states of the DSAs after a change is made by one DSA and replicated to another DSA in connection with an exemplary embodiment of the present invention.

At this time, a backup is made of the contents of DSA1's local database. The backup records the current state of the DSA1 database, which as noted above defines Jack's phone number as 206-555-1234 and Bob's job title as Engineer. Thereafter, due to a recent area code change, Jack updates his phone number to 425-555-1234 on DSA1, and this change gets the signature (Database-GUID1, 101). This update is replicated to and is applied by DSA3, which updates its UTD vector to {(Database-GUID1, 101), (Database-GUID2, 200)}. The state of the three DSAs at this time is shown in FIG. 2.

Immediately thereafter, a power failure takes down all DSAs. Note that DSA2 has not yet applied the update to Jack's phone number. When power is restored, an administrator discovers that DSA1's database has been damaged by disk write failure and must be restored from backup. In addition, the network card of DSA3 has been damaged and must be replaced. DSA2 is now the only functional replica of the directory service in operation.

Figure 3:
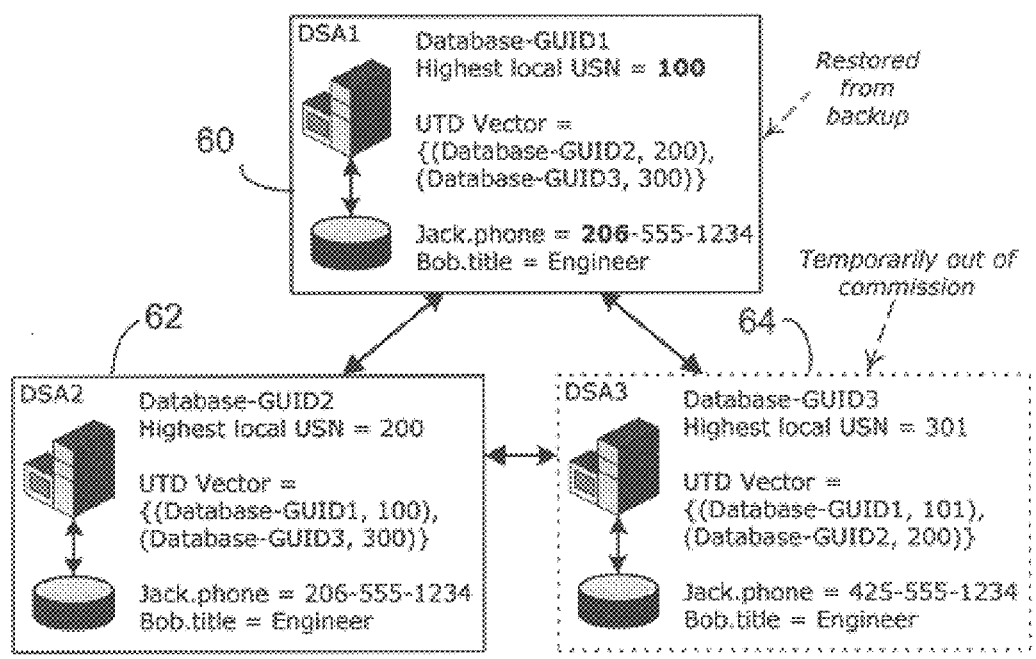
FIG. 3 is a schematic diagram showing the states of the DSAs after one DSA is restored from backup in accordance with a conventional approach in connection with an exemplary embodiment of the present invention.

Subsequently, DSA1 is restored to its exact state at the time of the backup such that it is at USN 100 using Database-GUID1, and records Jack's old phone number (206-555-1234). DSA2 also has Jack's old phone number. This post-restoration state of the DSAs is shown in FIG. 3.

Figure 4:
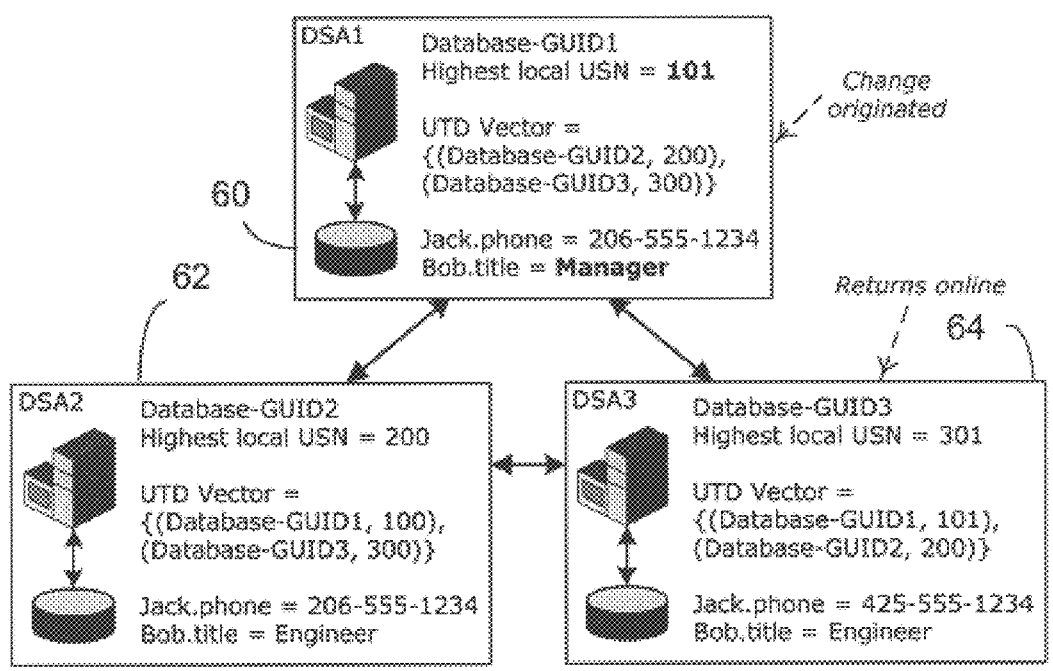
FIG. 4 is a schematic diagram showing the states of the DSAs illustrating a replication inconsistency following the restoration of a DSA caused by the conventional restoration approach of FIG. 3 in connection with an exemplary embodiment of the present invention.

The following discussion in connection with FIG. 4 shows what happens when no additional logic is applied to the restored data before DSA1 is brought back online. After DSA1 is restored, the accounting department updates Bob's job title to reflect his recent promotion. Picking any available DSA at random on which to make the change, DSA1 is chosen. Bob's job title is changed to Manager, which gets the signature (Database-GUID1, 101). Note that this signature is identical to the signature given to the phone number update that was made after DSA1 was backed up (but before it was restored). This violates the rule that signatures must be unique, and is the root of the problems illustrated below.

At this time the administrator has finished replacing DSA3's network card, and DSA3 is returned online. The current state of each DSA is now unique, as seen in FIG. 4. Specifically, the UTD vector on DSA3 asserts that it has seen the change with signature (Database-GUID1,101). Due to the restoration of DSA1 from backup, there are now multiple changes with this signature—the update to Jack's phone number and the update to Bob's job title. If DSA3 now initiates replication from DSA1, asserting that it has seen all updates through the signature (Database-GUID1, 101), DSA1 will determine that it has no data to send to DSA3. As a result, DSA3's final state is unchanged. The final state of DSA2, on the other hand, is determined by which DSA it replicates from first. If it first replicates from DSA1, it will receive and apply Bob's new job title but never Jack's updated phone number. If it first replicates from DSA2, it will receive and apply Jack's updated phone number but never Bob's new job title.

At this point, all updates and replication have ceased, but discrepancies amongst the DSAs exist—i.e., the replication algorithm has failed to ensure the convergence of data across all DSAs. This is clearly unacceptable.

It has been proposed to solve this inconsistency problem by a "backsyncing" process that is carried out after a DSA is restored from backup and before it goes online to accept new changes. During this time the DSA attempts to replicate in all changes that it itself generated between the time the backup was made and the time the restore was performed. In the example above, the goal would be to replicate in Jack's new phone number. Upon receiving the change DSA1 would realize that it had already assigned signature (Database-GUID1,101) to an update. It then increases its internal USN so that a subsequent change would get a unique signature (e.g., (Database-GUID1,102)).

Backsyncing is an acceptable solution for the convergence problem as long as DSA1 successfully replicates in all of its post-backup, pre-restore changes from another replica before it returns online to become write-enabled. This is a requirement difficult to meet, however. In the example of FIG. 3, if DSA1 is required to replicate from both DSA2 and DSA3 before coming online for directory service, then it could not come online until DSA3's network card were repaired. If the network card had to be ordered, it might be waiting for a time, such as a week or more. During that waiting period, DSA2, being the sole DSA online, would be a single point of failure. If DSA1 requires that it replicate from either DSA2 or DSA3 before coming online, then it might miss changes. In the example above, this would lead to the same problem as if backsyncing did not take place, as the only DSA that had the phone number update (DSA3) was not online at the time DSA2 was restored. Thus, convergence of the replication algorithm could not be ensured.

In accordance with a feature of the invention, the replication errors after restoration is effectively avoided, and convergence of the states of the DSAs through replication is ensured, by assigning to the restored DSA a new database GUID. This mechanism forces the restored DSA to appear as if it were an entirely new replication partner as far as the replication algorithm is concerned.

Figure 5:
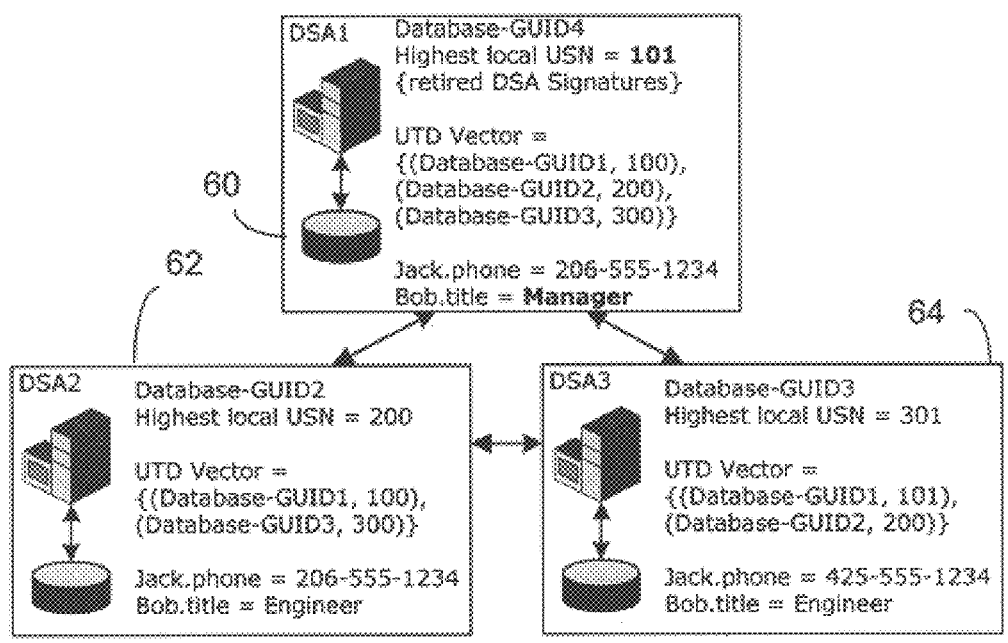
FIG. 5 is a schematic diagram showing the states of the DSAs wherein a new change applied to a restored DSA is identified by a new GUID to avoid replication errors in connection with an exemplary embodiment of the present invention.

In a preferred embodiment, the USN issued to the first change made by the local database subsequent to the restoration is not reset to 0, but is given a value that is greater than, and preferably consecutive to, the highest USN in the backup. Returning to the example described earlier, the states of the DSAs after DSA1 is restored from backup and Bob's job title is updated on DSA1 in accordance with the invention are shown in FIG. 5. As illustrated, the GUID of DSA1 after the restoration is changed to Database-GUID4, and the new change added is given USN=101.

In one embodiment, the new DSA reports no knowledge of changes made under its previous database GUID when asking for updates from other DSAs. It reports knowledge only of changes made under its current database GUID and those covered by the UTD vector it maintains for the other DSAs. Such information does not contain the database GUID it used at the time of backup. This ensures that any post-backup pre-restoration changes will be replicated to the restored DSA from other DSAs, just as if the changes were made on an entirely different DSA. Also, any new changes generated on the restored DSA get signatures relative to its new database GUID. These two factors combine to eliminate duplication of signatures, which in turn allows the replication algorithm to again guarantee convergence, regardless of which DSAs are online at the time the restoration from backup is performed and without requiring a backsync period.

This implementation, although effective, does not provide optimized performance concerns in some cases. Because DSA1 states no knowledge of the changes made under its previous database GUID, its replication partners may send all the data on such old changes to DSA1. This can be a great waste of network resources and bandwidth, as the number of post-back pre-restoration changes under the old database GUID that need to be sent may be very small as compared to the total number of changes under that GUID. In real-world applications, the number of changes made under the old invocation ID can number in the millions. Sending millions of unnecessary updates across the network can introduce performance and scaling problems.

A similar issue exists with respect to replication from the restored DSA to its replication partners. Because the DSAs that were not restored report no watermark with respect to the restored DSA's new database GUID, the restored DSA must potentially look at every object in its database to determine changes that need to be sent. This is because it must look at all objects starting at USN 0 (relative to the new database GUID), not at the highest USN following the last sync (relative to the old database GUID, which now has no bearing on the restored database). If the restored DSA's database is sufficiently large, this can introduce performance and scaling issues similar to the above.

In accordance with an embodiment of the invention, these problems are avoided and the replication performance is optimized by keeping track of the different GUIDs used by each DSA and the extent of each past backup of that DSA. Each time a DSA is restored from a backup, it records the GUID used and the highest USN in the backup. This combination of the last-used GUID and the highest backup USN is referred to as the "retired DSA signature." In this way, the restored DSA knows its highest USN and database GUID at the time of the backup. The collection of retired DSA signatures accrued by a DSA over its lifetime of sequential restores is called its "retired DSA signature vector."

To illustrate this point, an example (which is unrelated to the examples illustrated in the Figures) of the "retired DSA signature vector" is provided below. Consider a DSA backed up at (Database-GUID1,10); restored, acquiring Database-GUID2; backed up at (Database-GUID2, 35); restored, acquiring Database-GUID3; backed up at (Database-GUID3, 77); and finally restored, acquiring Database-GUID4. Its retired DSA signature vector would look like the following:

| Database GUID | USN |
|---|---|
| Database-GUID1 | 10 |
| Database-GUID2 | 35 |
| Database-GUID3 | 77 |

In a further embodiment of the present invention, to solve the problem of redundant replication to the restored server as described above, when the DSA is restored from backup, it adds a watermark in its UTD vector containing its old database GUID and the highest USN it assigned prior to being backed up. In doing so, it asserts that all changes it wrote to its own database prior to being backed up are still present in its database, and thereby prevents this data from being replicated back to it from other DSAs.

The solution to the problem of redundant replication from the restored server to the other DSAs is a little more involved, but operates on basically the same principle. When a destination DSA requests changes, it presents its UTD vector to the source DSA, regardless of whether the source DSA was restored from backup. In this embodiment, it is assumed that the mechanism used by the destination server to locate the source server is not based on the GUID of the source server, which may be changed, but on an immutable name of the source server that is independent of its GUID and other parameters, such as its location. When the source DSA has just been restored from backup, its replication partners are oblivious to the restoration. All they know to do is pass their UTD vectors to the source, apply the changes, and update their UTD vectors as instructed by the source. In this case the destination DSA presents a UTD vector that does not include a watermark with the current database GUID of the source—but it does include a watermark with the previous database GUID of the source.

Previously, when the source DSA did not find a watermark in the destination UTD vector that included its current database GUID, it started scanning its database at usnChanged=0 for changes that needed to be sent to the destination. This proves unnecessary, however, when the UTD vector includes a watermark for one of the restored DSA's previous database GUIDs.

By way of example, in the exemplary retired DSA signature vector above, assume the destination DSA presents a UTD vector containing watermark (Database-GUID3, 83). In other words, the destination DSA was in sync with changes made by the source DSA between the time it was backed up and the time it was restored, relative to its previous database GUID. Both the source DSA and the destination DSA agree on the changes recorded in the source DSA's database up to and including usnChanged 77. It is only usnChanged values greater than 77, which may be different—the destination DSA asserts it has seen usnChanged 77 to 83 relative to Database-GUID3, whereas on the source DSA usnChanged 77 to 83 are relative to its newest database GUID, Database-GUID4.

Since the destination DSA asserts it has seen updates with usnChanged<=77, the source DSA need not revisit these objects looking for changes to send to the destination DSA. It need look only at usnChanged>77, thus avoiding much unnecessary database activity. In actual applications, it would not be uncommon to be looking at usnChanged values of 7.7 million and 8.3 million, rather than 77 and 83. At the conclusion of this replication, the destination DSA updates his UTD vector to show that he is as up-to-date with respect to Database-GUID4 up to the source DSA's most recent USN, so future syncs can start at that point.

Assume, on the other hand, the destination DSA presents a UTD vector containing watermark (Database-GUID3, 72). This watermark indicates that the destination DSA is not synced up to all the changes made against the source DSA's previous database GUID prior to its backup. Similar to the above, both DSAs agree on changes made relative to the previous database GUID at usnChanged<=72, so the sync can start at usnChanged 72 just as if the restore were not performed. At the conclusion of this replication, the destination DSA updates his UTD vector to show that he is as up-to-date with respect to Database-GUID4 up to the source DSA's most recent USN (as above), and also up-to-date with respect to Database-GUID3 to USN 77.

Thus, the replication after restoration implemented in a preferred embodiment of the invention includes two parts: (1) changing the database GUID of a restored DSA to guarantee correctness or convergence of the replication among servers, and (2) USN optimization relative to previous database GUIDs for improved performance.

As mentioned in the background, another problem may arise in the context of the dynamic addition or removal of directory service partitions. In another embodiment of the present invention, a reliable and efficient way to handle replication among database servers when a partition has been removed from and re-added to a database is provided.

Figure 6:
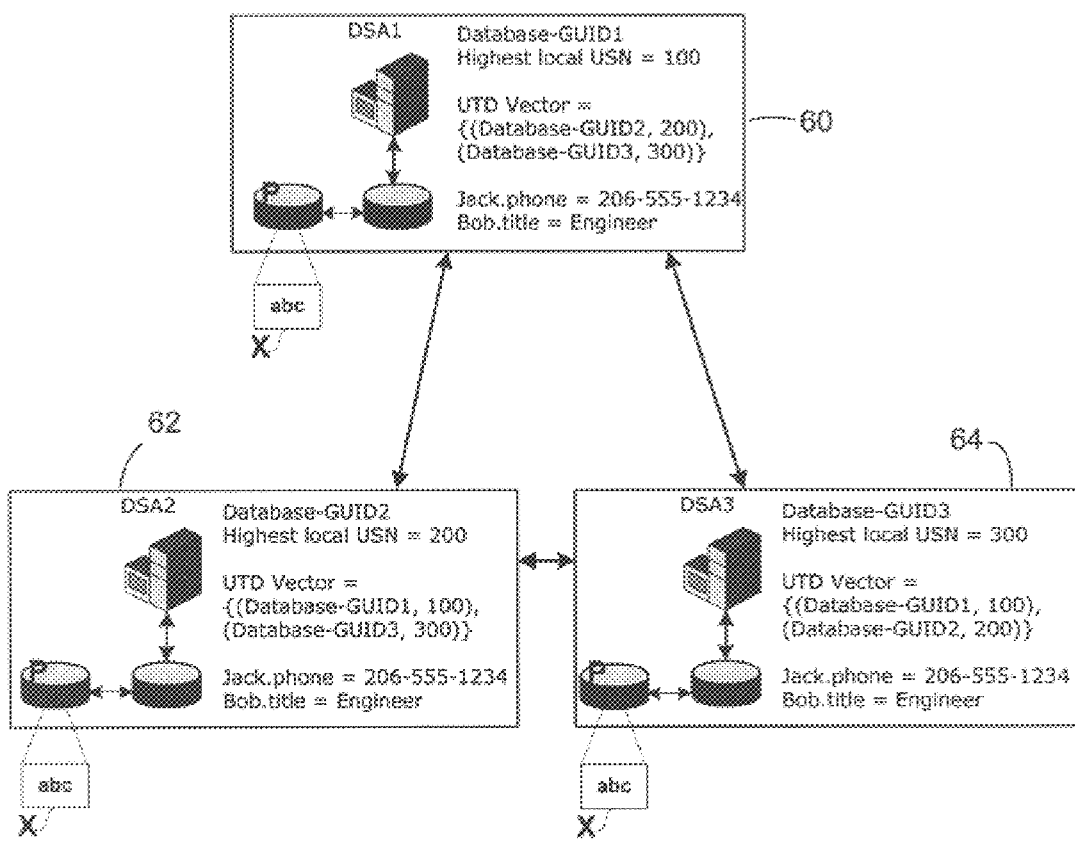
FIG. 6 is a schematic diagram showing the initial states of three DSAs of a database network that host a partition P in connection with a second exemplary embodiment of the present invention.

To illustrate how the removal of a directory service partition P can affect the consistent replication of change data across a network, FIG. 6 shows three DSAs, e.g. DSA1, DSA2, and DSA3, each configured to host a certain partition P, that are completely in sync—that is, DSA1 has all updates known by DSA2 and DSA3, DSA2 has all updates known by DSA1 and DSA3, and DSA3 has all updates known by DSA1 and DSA2. At the same time, each has a different USN for a given database GUID, e.g., 100 for DSA1 database GUID, 200 for DSA2 database GUID and 300 for DSA3 because changes have been originated on the respective DSAs unequally.

Figure 7:
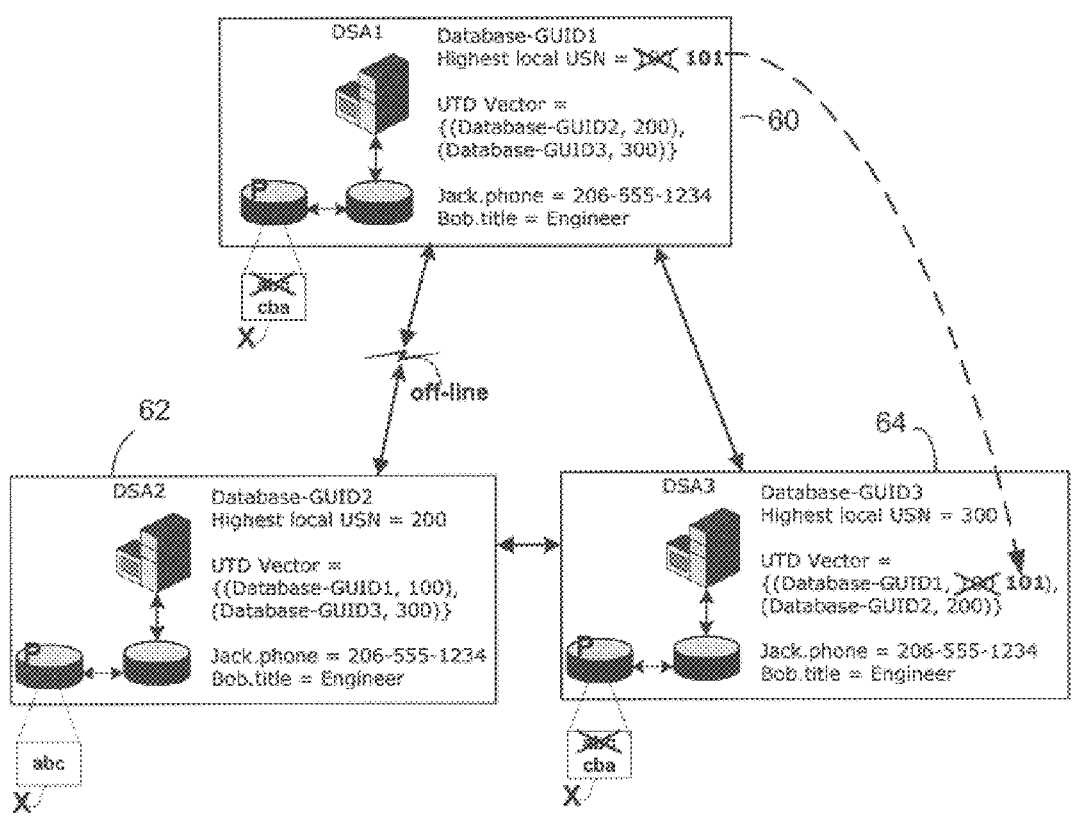
FIG. 7 is a schematic diagram showing the states of the DSAs after a change is made to a partition P by one DSA and replicated to another DSA in connection with a second exemplary embodiment of the present invention.

If a change to or update of an object X in partition P is then generated in DSA1, as shown in FIG. 7, the USN for DSA1 with respect to DSA1 database GUID becomes 101 (one more than 100). This change might then be replicated to DSA3, but not to DSA2. DSA2 may not receive the replication, for example, due to an off-line state.

Figure 8:
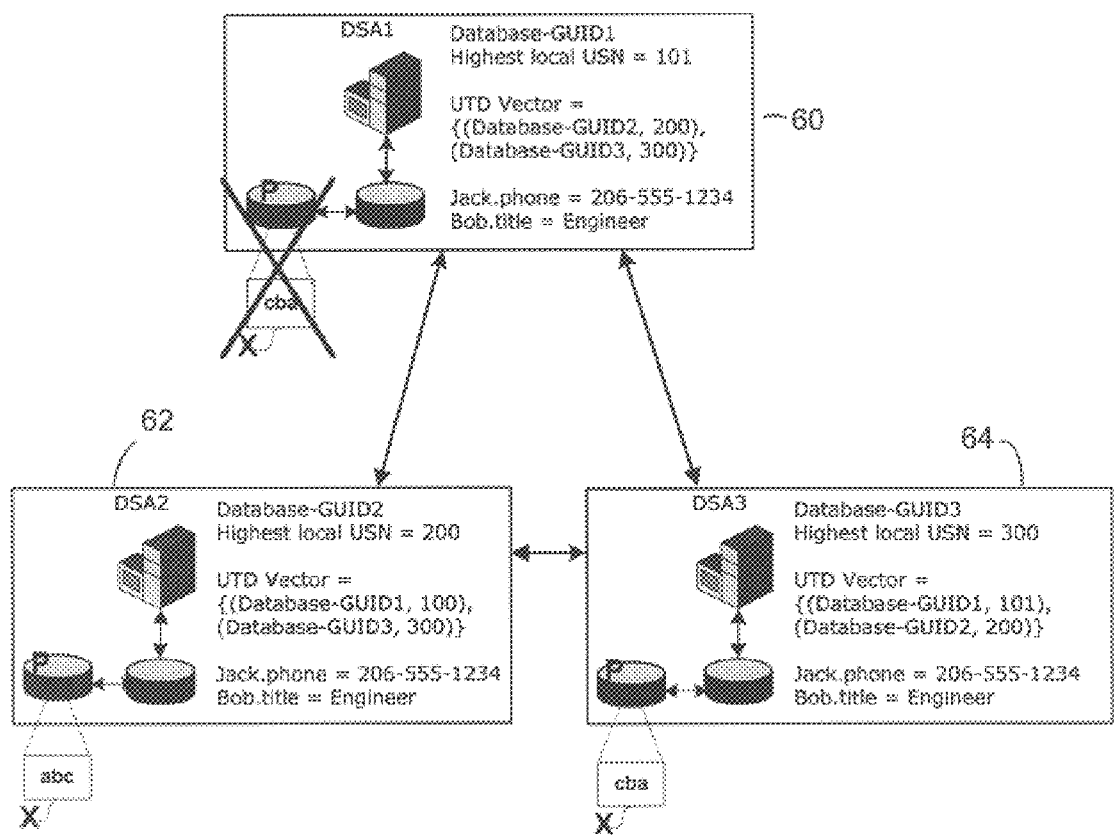
FIG. 8 is a schematic diagram showing the states of the DSAs after one DSA is configured to no longer host partition P in connection with a second exemplary embodiment of the present invention.

Then, as shown in FIG. 8, if DSA1 is then reconfigured to no longer host partition P (though DSA1 may continue to host other partitions), DSA1 removes its local copy of partition P. The remaining DSAs, however, will continue to keep an entry for the DSA1 database GUID in their up-to-dateness vectors so as to optimize updates made by DSA1 that may still be replicating through the system. The source of the problem associated with the decommissioned partition, however, is that while DSA2 may be brought back online after being offline, DSA2 may not yet have replicated the change to object X that originated on DSA1 corresponding to USN 101. As shown in FIG. 8, DSA2, though back on-line, has not yet received the change data originated on partition P in DSA1 and replicated to DSA3.

Figure 9:
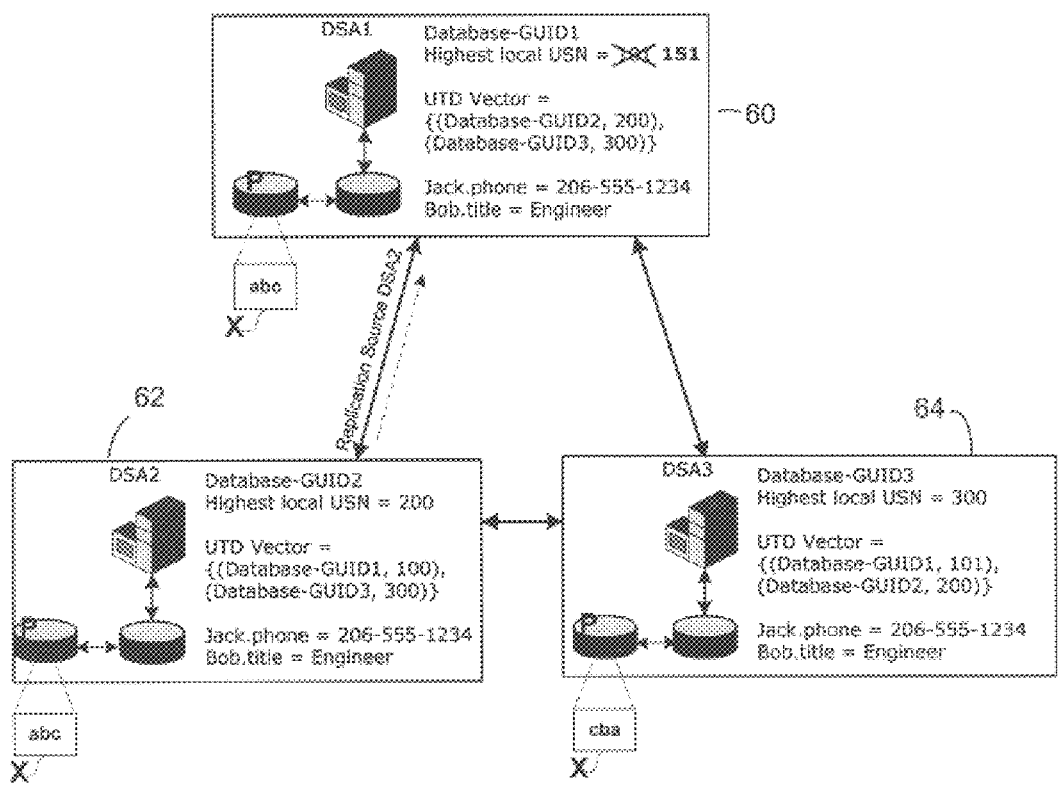
FIG. 9 is a schematic diagram showing the states of the DSAs illustrating exemplary replication inconsistency following the reconfiguration of the DSA to host partition P after its removal in FIG. 8 in connection with a second exemplary embodiment of the present invention.

If an administrator decides that DSA1 should host partition P again, then during a typical replication process, as shown in FIG. 9, DSA1 may fully replicate the contents of P from DSA2 instead of DSA3 and the local changes that DSA1 makes incident thereto may consume, e.g., 50 USNs. As a consequence, DSA1 represents that it has seen all of its own changes through USN 151, although it has not replicated the change to object X it originally generated at USN 101, which information remains only in DSA3. That change was lost when DSA1 removed its copy of partition P and reconstituted its information from DSA2 instead of DSA3.

FIG. 9 thus illustrates an exemplary scenario wherein the removal of and re-addition of a partition P can lead to a state conducive to inconsistency of replication. For instance, if DSA1 then initiates replication from DSA3 after replication from DSA2, DSA1 will still not embody the change of USN 101, since according to existing procedure, DSA3 will believe DSA1's claim that it has seen all changes stamped with DSA1's database GUID through USN 151, including USN 101. DSA1's claim is not true, however, since DSA1 does not embody the change of USN 101. Consequently, the change generated at USN 101 is lost.

Figure 10:
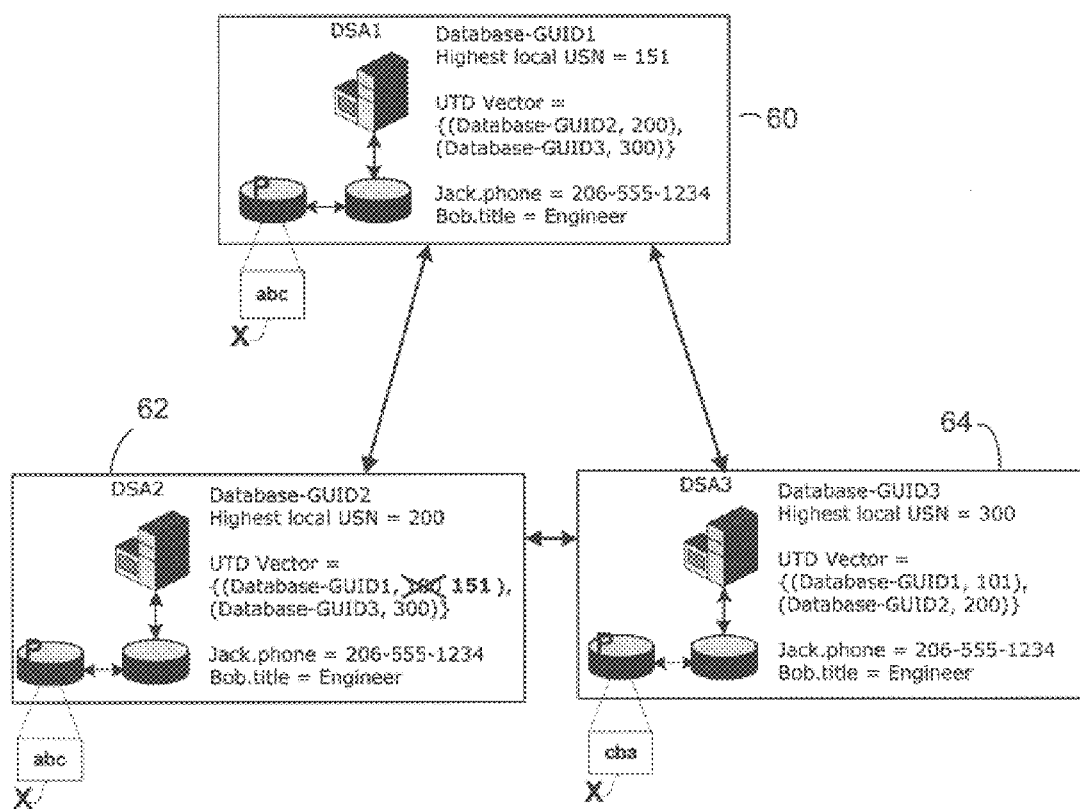
FIG. 10 is a schematic diagram showing the states of the DSAs illustrating another exemplary replication inconsistency after additional replication of changes following the reconfiguration of the DSA to host partition P in connection with a second exemplary embodiment of the present invention.

Similarly, if DSA2 then replicates from DSA1, as shown in FIG. 10, and then from DSA3, it will also never replicate in the change to object X for the same reason. DSA2 will also claim it has seen all changes stamped with DSA1's database GUID through USN 151. This is because DSA3 will believe DSA2's claim that it has seen all changes stamped with DSA1's database GUID through USN 151 and not send the update stamped with USN 101.

Figure 11:
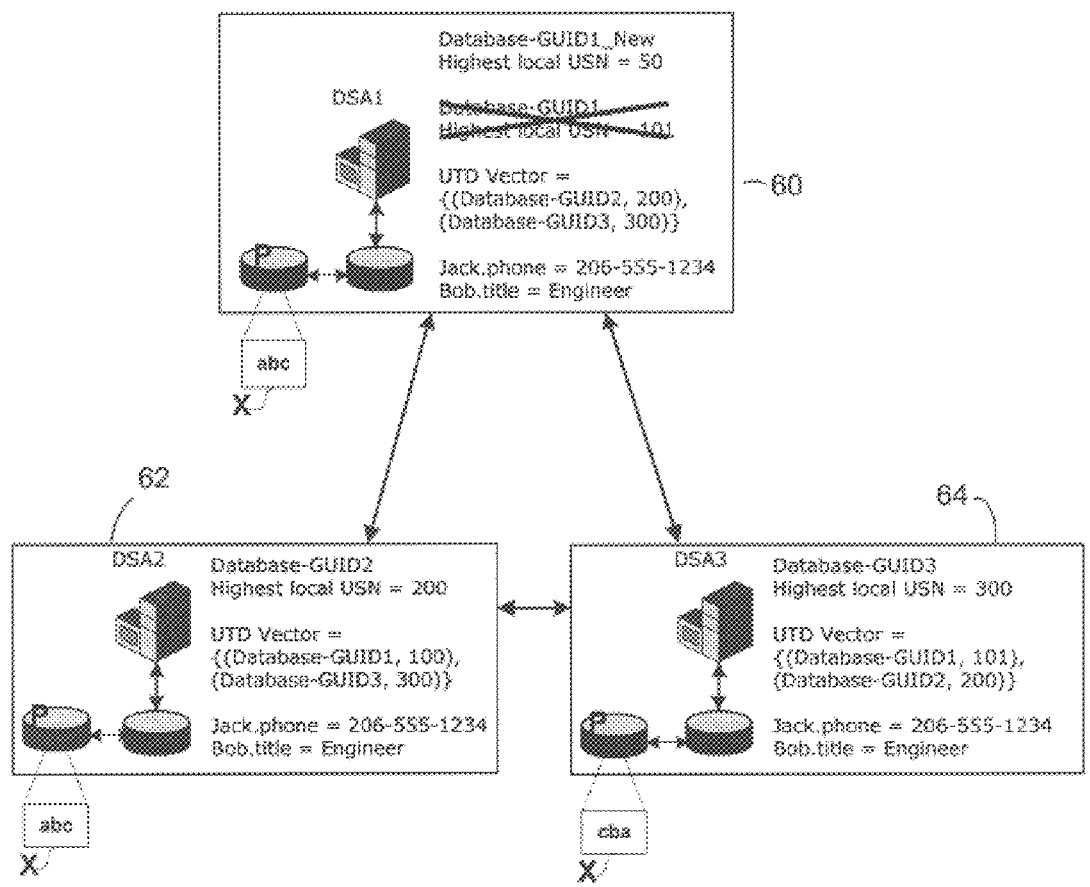
FIG. 11 is a schematic diagram showing the states of the DSAs illustrating the retiring of an old GUID and the assignment of a new GUID following the reconfiguration of the DSA to host partition P in connection with a second exemplary embodiment of the present invention.
Figure 12:
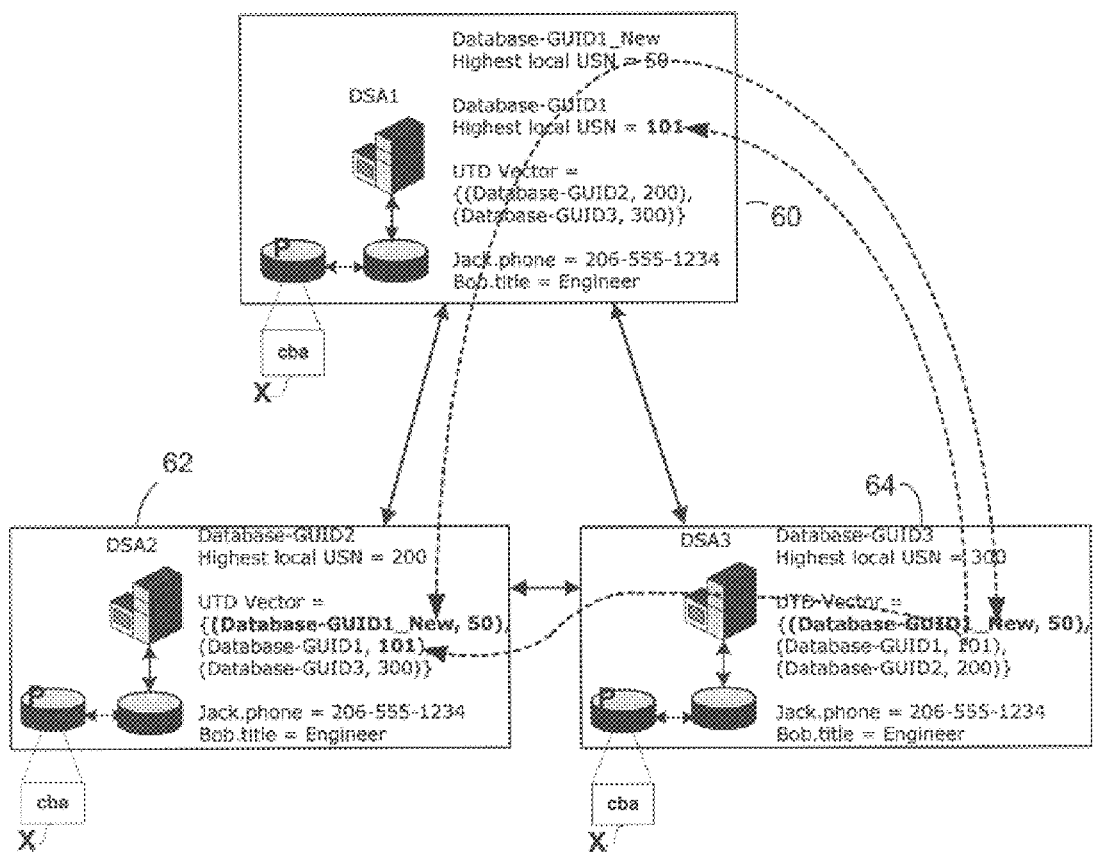
FIG. 12 is a schematic diagram showing convergent states of the DSAs illustrating the avoidance of replication inconsistencies, such as those illustrated in FIGS. 9 and 10, as a result of the assignment of a new GUID following the reconfiguration of the DSA to host partition P in connection with a second exemplary embodiment of the present invention.

To prevent inconsistencies such as those illustrated in FIGS. 9 and 10, in accordance with the invention, as illustrated in FIG. 11, the old database GUID is retired, and a new GUID, GUID1_New, is assigned. Consistent with the example of FIG. 9, if DSA1 then replicates from DSA2, and 50 local changes are required to effect the replication, then the newly assigned GUID's highest local USN increases monotonically 50 times and becomes 50. At this point, the stage is set for convergence. As FIG. 12 shows, according to typical replication procedures, neither DSA1 nor DSA2 will represent that they have seen changes up to USN 101 for GUID1 (the old GUID), and accordingly replication procedures will work to replicate changes up to USN 101 for GUID1 to DSA1 and DSA2 from DSA3. Similarly, neither DSA2 nor DSA3 will represent that they have any changes with the new GUID, GUID1_New, and accordingly these changes will be replicated to DSA2 and DSA3 from DSA1 until convergence is achieved. Further changes may also be made and replicated according to typical procedures because inconsistencies, such as those shown in FIGS. 9 and 10, have been avoided.

As mentioned, the problem arises when a DSA claims it has seen changes it made in the past that it no longer has in its local database. This is similar to the restore from backup scenario described in connection with FIGS. 1 through 5. With restore, updates made after the backup but before the restore are no longer present on the restored DSA and thus the DSA can not claim to have seen those updates. Similarly, when a partition is removed from a DSA and then re-added, the DSA's database may not have all the updates it contained prior to the partition removal and thus the DSA cannot claim to have seen those updates.

In the restore from backup case, there is some subset of its own changes for which the restored DSA can claim to still have accountability i.e, all updates in its database at the time of restore. There is no such subset in the partition removal and re-addition case that may be known with any certainty i.e., all changes previously held by the DSA are considered gone from its local database.

Thus, the solution is similar to the solution for restore from backup. At a high level, data changes from a time previous to the removal of the partition retain the old identifier while data changes subsequent to the re-addition of the partition are assigned a new identifier. In this fashion, the replication scheme loses no changed information as a consequence of the partition removal. More particularly, the DSA on which the partition is re-added retires its old database GUID and is assigned a new one for purposes of all new changes. The DSA then claims to have seen only those changes originated by its old database GUID that it actually receives through replication. Extending the solution to the example above, after FIG. 8 but before FIG. 9, a new DSA1 database GUID is assigned for all subsequent changes to partition P. All of the changes occurring prior to the re-addition of the partition will be replicated in with the old DSA1 database GUID. All of the changes occurring after the re-addition of the partition will be replicated out with the new DSA1 database GUID. Thus, all of the information will be preserved for consistent replication.

Figure 13:
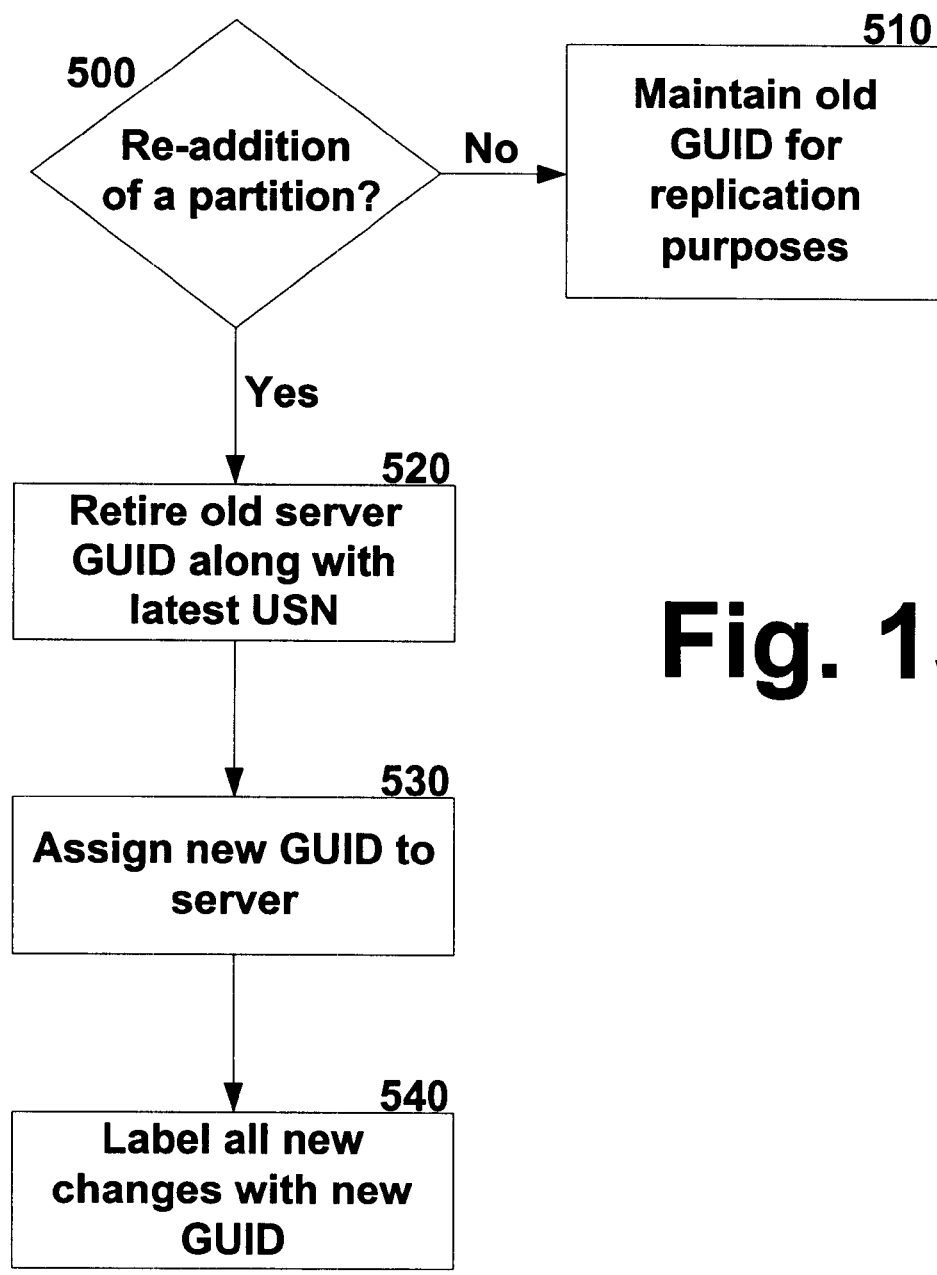
FIG. 13 is a flow diagram illustrating the process of assigning a new GUID to a server following the reconfiguration of the DSA to host partition P in connection with a second exemplary embodiment of the present invention.

An exemplary flow diagram illustrating the technique of the present invention as applied to the case of the re-addition of a partition is shown in FIG. 13. At 500, a determination is made for a server as to whether a partition has been re-added to a database under the management. If not, at 510, the old GUID is maintained for further changes, maintaining status quo. If so, at 520, the old server GUID along with the corresponding highest local USN for the old server GUID is retired. At 530, a new GUID is assigned to the server for purposes of further local changes to the database. At 540, it is understood that all new local changes are assigned the new server GUID. Replication may then proceed as usual, only DSA1 effectively has two (or more depending upon the number of iterations of partition removal and re-addition) separate GUIDs and corresponding USNs for replication purposes, one for pre-dating the re-addition of the partition and one for post-dating the re-addition of the partition.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of directory service agents (DSAs), the invention may be applied to any database network in which changes made to databases are replicated to other databases in the network. One skilled in the art will recognize that the present invention is not limited to the cases of restore or partition removal or re-addition. Rather, the invention may apply to any scenario wherein data is lost, causing inconsistency of replication across the network. In such circumstances and according to the present invention, a new GUID may be assigned to the local server at the time of the loss, in order to distinguish between data changes occurring before the loss and data changes after the loss. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for managing replication of database changes between servers of a database network, each of the servers having at least one server identification for labeling database changes originated by each server, the method comprising:

detecting a re-addition of a partition of a database managed by a server of the database network, the server having an old server identification for labeling database changes originated by the database before the re-addition of the partition; and assigning a new server identification different than the old server identification to the server for labeling database changes originated by the server after the re-addition of the partition.

2. A method as in claim 1, further including:

retiring the old server identification at the server.

3. A method as in claim 2, further including:

receiving a replication request for database changes from a destination server in the database network, the replication request including a replication watermark for database changes labeled with the old server identification.

4. A method as in claim 3, further including:

sending database changes labeled with the new server identification to the destination server in response to the receipt of the replication request.

5. A method as in claim 2, further including:

presenting, by the server, a replication watermark to a second database server of the database network for replication.

6. A method as in claim 5, further including:

sending database changes labeled with the old server identification from the second server to the server.

7. A method as in claim 6, further including updating, by the second server, the replication watermark for database changes under the new server identification of the server.

8. A computer readable medium having computer executable for carrying out the method of:
- detecting a re-addition of a partition to a database managed by a server in a database network;
- retiring an old server identification used by the server at time of said detecting of the re-addition;
- assigning a new server identification for identifying changes to the database managed by the server after said detecting of the re-addition; and
- labeling database changes originated by the server after the detecting of the re-addition with the new server identification.

9. A computer readable medium as in claim 8, having further computer-executable instruction for performing:
- receiving a replication request from a destination server of the database network containing a replication watermark with the old server identification; and
- sending to the destination server database changes made under the new server identification.

10. A computer-readable medium as in claim 9, having further computer-executable instruction for performing:
- sending to the destination server database changes under the new server identification made by the server after the re-addition of the partition.

11. A computer readable medium as in claim 8, having further computer-executable instructions for performing:
- storing a replication watermark, by the server, having the old server identification with a sequence number reflecting changes before said re-addition and the new server identification with a sequence number reflecting changes after said re-addition.

12. A computer-readable medium having stored thereon a data structure, comprising:
(a) a first data field containing at least one retired server identification previously used by a server in a database network for labeling database changes originated by the database server for replication with other database servers of the database network;
(b) a second data field containing a new server identification used by the server to label changes occurring in said database subsequent to the re-addition of a partition.

13. A computer-readable medium as in claim 12, wherein the retired server identifications are numbers uniquely identifying the server in the database network and uniquely identify change originated in the server previous to the re-addition of the partition.

14. A server in a database system, the system for managing replication of database changes between servers of a database network, the server having at least one server identification for labeling database changes originated by the server, wherein said server responds to the detection of a re-addition of a partition formerly under its management by (a) assigning a new server identification to changes made subsequent to the re-addition, and (b) retiring previous server identifications for changes made previous to the re-addition, wherein the previous server identifications were utilized for labeling database cages originated by the database before the re-addition of the partition.

15. A server according to claim 14, wherein changes labeled with said previous server identifications are replicated in to said server from at least one other database server in said database system.

16. A server according to claim 14, wherein changes made to said server after the re-addition are labeled with the new server identification.

17. A server according to claim 16, wherein changes labeled with said new server identification are replicated to at least one other database server in said database system.

* * * * *

UNITED STATES PATENT AND TRADEMARK OFFICE
CERTIFICATE OF CORRECTION

PATENT NO. : 6,654,771 B1
DATED : November 25, 2003
INVENTOR(S) : Jeffrey B. Parham and William B. Lees It is certified that error appears in the above-identified patent and that said Letters Patent is hereby corrected as shown below:

<u>Column 1,</u>
Lines 7-8, delete "now U.S. Pat. No. 6,453,326," in line 7 and insert
-- now U.S. Pat. No. 6,453,326, -- after "1999" in line 8 therefor;

<u>Column 4,</u>
Line 62, delete "; and" and insert -- . -- therefor;

<u>Column 12,</u>
Line 64, insert -- : -- after "including";

<u>Column 14,</u>
Line 24, delete "cages" and insert -- changes -- therefor.

Signed and Sealed this

Sixth Day of April, 2004

JON W. DUDAS
*Acting Director of the United States Patent and Trademark Office*